United States Patent Office 3,577,399
Patented May 4, 1971

3,577,399
ETHYLENE INTERPOLYMERS
George A. Mortimer, La Marque, Tex., assignor to Monsanto Company, St. Louis, Mo.
No Drawing. Filed Sept. 23, 1968, Ser. No. 761,837
Int. Cl. C08f 15/04
U.S. Cl. 260—88.1                    4 Claims

ABSTRACT OF THE DISCLOSURE

Compositions of matter comprised of interpolymers of ethylene and from 1 to 10 mole percent of a monovinyl silane and a method for their preparation.

BACKGROUND OF THE INVENTION

The present invention relates to interpolymers of ethylene. More particularly, the present invention relates to interpolymers of ethylene with monovinyl silanes.

Ethylene has been polymerized with numerous other monomers to provide a wide variety of interpolymer compositions. However, interpolymers of ethylene and monovinyl silanes suitable for films, moldings and the like have heretofore not been prepared.

SUMMARY OF THE INVENTION

It is therefore an object of the present invention to provide interpolymers of ethylene and monovinyl silanes suitable for films, moldings and the like.

It is a further object of the present invention to provide interpolymers of ethylene and monovinyl silanes characterized by being translucent.

These and other objects are accomplished by the present invention which in one embodiment provides interpolymers comprising ethylene and from 1 to 10 mole percent of a monovinyl silane of the formula $CH_2=CHSiR_1R_2R_3$ wherein $R_1$, $R_2$ and $R_3$ are alkyl groups having from one to four carbon atoms.

In another embodiment, the present invention provides a process for preparing ethylene interpolymers which comprises reacting ethylene and a monovinyl silane having the structure $CH_2=CHSiR_1R_2R_3$ wherein $R_1$, $R_2$ and $R_3$ are alkyl groups having from one to four carbon atoms, at elevated pressures and temperatures in the presence of a free-radical-generating compound.

DESCRIPTION OF THE PREFERRED EMBODIMENTS

The monovinyl silanes useful in the present invention are those having the structure $CH_2=CHSiR_1R_2R_3$ wherein $R_1$, $R_2$ and $R_3$ are alkyl groups of from one to four carbon atoms. Vinyltrimethylsilane has been found to be a particularly desirable comonomer.

The interpolymers of the present invention can contain from 1 to 10 mole percent of the silane. The preferred interpolymers, however, are those containing from about 95 to 99 mole percent ethylene and 1 to 5 mole percent of the monovinyl silane.

The polymerization process by which the interpoolymers are produced is conducted at superatmospheric pressures from about 5,000 p.s.i.g. up to as high as 60,000 p.s.i.g. Preferably, the pressures employed are in the range from about 15,000 to about 35,000 p.s.i.g.

While the temperature of the polymerization process may be varied over the range from about 100° to about 400° C., preferred temperatures are those from about 130° to about 300° C.

Any of the well known free-radical initiators used for catalyzing the polymerization of ethylene can be employed for producing the novel interpolymers herein described. Among these may be mentioined molecular oxygen; peroxygen type compounds such as hydrogen peroxide, dialkyl dioxides such as diethyl peroxide and di-tert-butyl peroxide, diacyl peroxides such as lauroyl peroxide and benzoyl peroxide, alkyl hydroperoxides such as tert-butyl hydroperoxide, diperoxy dicarbonate esters such as diisopropyl peroxydicarbonate, tert-alkyl percarboxylates such as tert-butyl perbenzoate, persulfates such as potassium persulfate, peracids such as peracetic acid and the like; azo-type compounds such as azo-bis (isobutyronitrile); azines such as benzalazine; oximes such as acetone oxime; etc. The initiators may be used alone or in any combination. Particularly suitable are peroxides such as di-tert-butyl peroxide, for example. Only small amounts of the initiator are required. Generally, initiator concentration will vary from about 0.0005% to about 2% of the total weight of the monomers charged to the polymerization reactor.

So-called polymerization "modifiers" or chain-transfer agents can also be employed in the manufacture of the interpolymers of the invention, if desired, to obtain certain polymer properties which such modifiers or chain-transfer agents may impart. Examples of compounds in general used in the art for this purpose are aliphatic alcohols containing one to ten carbon atoms and preferably one to five carbon atoms such as methanol, ethanol, propanol, isobutaneol, and the like; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as acetaldehyde, propionaldehyde and the like; saturated hydrocarbons such as ethane, propane, cyclohexane and the like; aromatic hydrocarbons such as toluene, xylene and the like; chlorinated hydrocarbons such as chloroform, carbon tetrachlroide and the like; and hydrogen.

The polymerization process may be either a batch or a continuous one. The preferred method is the continuous type of operation where ethylene, the monovinyl silane, initiator or initiators, and modifiers if one or more are used, are charged to a reactor maintained under suitable conditions of temperature and pressure, interpolymer is continuously separated from the reactor effluent, and unreacted monomers, initiators, and modifiers, if any, may be recycled to the reactor.

The invention is illustrated in the examples below which, however, are not to be construed as limiting it in any manner whatsoever. All percentages given therein are on a molar basis unless otherwise indicated.

EXAMPLE I

A steel reaction bomb together with all accessory lines thereto was carefully cleaned and flushed with ethylene to eliminate all traces of air or oxygen. Propane as a chain-transfer agent plus some ethylene were introduced into the reaction chamber of the bomb heated to the reaction temperature of 130 C. at atmospheric pressure until the pressure increased to about 700 p.s.i. Thereafter, additional ethylene was pumped into the bomb until the pressure reached about 7500 p.s.i. at the temperature level of 130° C. Then, the mechanical agitator inside the bomb was activated and vinyltrimethylsilane and di-tert-butyl peroxide initiator (DTBP) dissolved in benzene were forced from a small cold compartment of the bomb where they had been stored free of air or oxygen contamination into the reaction chamber by means of high pressure ethylene chargèd until a final pressure of 20,000 p.s.i. at 130° C. was attained. The final charge consisted of 83.91% ethylene, 14.32% propane, 1.62% vinyltrimethylsilane, and 0.16% benzene. The DTBP concentration was $4.1 \times 10^{-4}$ moles per liter of reactor volume. After a 78-minute reaction time, the bomb was depressurized and the polymer product in 4.3% conversion by weight was recovered and its physical properties determined.

By elemental analysis, the copolymer contained 2.9% vinyltrimethylsilane and 97.1% ethylene. The melt index, determined as described in J. App. Polymer Sci., 8, 839 (1964) was 36. All other evaluations were performed on nominally 20-mil thick specimens. Diffuse luminous transmittance as determined by procedure A of ASTM D–1003–61 was 61%. A ½" x 3" strip was pulled at 0.1 in./min. in an Instron testing machine to give a 2% secant modulus value of 860 kg./cm.² The L specimen of ASTM D–1822–61T was pulled in the same machine at 2 in./min. and from the force curve and dimensions of the unextended specimen the following values were calculated: 75 kg./cm.² tensile at yield (21% elongation) and 160 kg./cm.² tensile at fail (920% elongation).

EXAMPLE II

Following the procedure of Example 1, a feed consisting of 86.86% ethylene, 10.58% propane, 2.43% vinyltrimethylsilane, and 0.13% benzene containing $2.24 \times 10^{-3}$ moles per liter of DTBP was polymerized for 51 minutes to give in 7.3% conversion by weight a copolymer consisting of 3.8% vinyltrimethylsilane and 96.2% ethylene which had a melt index of 55, a modulus of 620 kg./cm.², a tensile at yield of 56 kg./cm.² (25% elongation), a tensile at fail of 145 kg./cm.² (1030% elongation), and a diffuse luminous transmittance of 50%. The tensile impact value obtained by ASTM D–1822–61T using the S specimen was 4.1 kg.-m./cm.².

As the data in the examples above show the novel interpolymers of the present invention flow very easily. They are suitable for producing tough, impact-resistant molded objects and films. As further shown by the diffuse luminous transmittance data, the interpolymers herein are translucent making them ideally suited for decorative purposes.

The interpolymers of the present invention may be blended with other thermoplastic polymers. Fillers, reinforcing agents, such as fibrous materials, and foaming agents may be added to the interpolymers to render them suitable for particular applications. The properties of the interpolymers can be preserved or enhanced by the addition of anti-oxidants and stabilizing agents, and pigments may be added to the interpolymers to obtain colored compositions.

What is claimed is:
1. A process for preparing ethylene interpolymers consisting essentially of ethylene and from 1 to 10 mole percent of a monovinyl silane of the formula

$$CH_2=CHSiR_1R_2R_3$$

wherein $R_1$, $R_2$ and $R_3$ are alkyl groups having from one to four carbon atoms, which comprises reacting ethylene and the monovinyl silane at a pressure from about 5,000 to about 60,000 p.s.i. and a temperature from about 100° to 400° C. in the presence of a free-radical-generating compound.

2. The process of claim 1 wherein the pressure is from about 15,000 to about 35,000 p.s.i., the temperature is from about 130° to about 300° C., said free-radical compound is di-tert-butyl peroxide and a saturated hydrocarbon is employed as a polymerization modifier.

3. The process of claim 2 wherein said saturated hydrocarbon is propane.

4. The process of claim 3 wherein said monovinyl silane is vinyltrimethylsilane.

References Cited

UNITED STATES PATENTS

| | | | |
|---|---|---|---|
| 3,025,267 | 3/1962 | Calfee | 260—88.1 |
| 3,033,840 | 5/1962 | Strauss | 260—88.1 |
| 3,125,554 | 3/1964 | Cooper et al. | 260—80PS |
| 3,159,608 | 12/1964 | Ilnyckyj | 260—88.1 |
| 3,225,018 | 12/1965 | Zutty | 260—88.1 |
| 3,226,374 | 12/1965 | White et al. | 260—88.1 |
| 3,227,697 | 1/1966 | Beamon et al. | 260—88.1 |
| 3,322,807 | 5/1967 | Johnson | 260—80PS |
| 3,392,156 | 7/1968 | Donaldson | 260—88.1 |

HARRY WONG, JR., Primary Examiner

U.S. Cl. X.R.
260—897